United States Patent [19]

Zaschke et al.

[11] 4,348,298

[45] Sep. 7, 1982

[54] NEMATIC LIQUID CRYSTAL MIXTURES

[75] Inventors: Horst Zaschke; Rudolf Wolff; Gerhard Pelzl; Dietrich Demus, all of Halle, German Democratic Rep.

[73] Assignee: VEB Werk fur Fernsehelektronik im Veb Kombinat Mikroelektronik, Berlin-Oberschöneweide, German Democratic Rep.

[21] Appl. No.: 136,036

[22] Filed: Mar. 31, 1980

Related U.S. Application Data

[63] Continuation-in-part of Ser. No. 46,842, Jun. 8, 1979, abandoned.

[30] Foreign Application Priority Data

Jun. 16, 1978 [DD] German Democratic Rep. ... 206038

[51] Int. Cl.$^3$ .......................... C09K 3/34; G02F 1/13; C07D 257/08
[52] U.S. Cl. .......................... 252/299.1; 252/299.61; 544/179; 350/349
[58] Field of Search .................... 544/179; 252/299.1, 252/299.61; 350/349

[56] References Cited

U.S. PATENT DOCUMENTS

| | | | |
|---|---|---|---|
| 3,166,399 | 1/1965 | Lutz et al. | 544/179 |
| 3,703,329 | 11/1972 | Castellano | 252/299.1 |
| 3,960,750 | 6/1976 | Moriyama et al. | 252/299.1 |
| 4,137,193 | 1/1979 | Osman et al. | 252/299.1 |
| 4,145,114 | 3/1979 | Coates et al. | 252/299.1 |

FOREIGN PATENT DOCUMENTS

| | | | |
|---|---|---|---|
| 2257588 | 6/1973 | Fed. Rep. of Germany | 252/299.61 |
| 2846409 | 6/1979 | Fed. Rep. of Germany | 252/299.61 |
| 2841245 | 7/1979 | Fed. Rep. of Germany | 252/299.61 |
| 2841246 | 8/1979 | Fed. Rep. of Germany | 252/299.61 |
| 105701 | 5/1974 | German Democratic Rep. | 252/299.63 |
| 132591 | 10/1978 | German Democratic Rep. | 252/299.63 |
| 49-4532 | 2/1974 | Japan | 544/179 |
| 498300 | 1/1976 | U.S.S.R. | 544/179 |

OTHER PUBLICATIONS

Demus, D., et al.; Mol. Cryst. Liq. Cryst., vol. 56 (Letters), pp. 115–121 (1979).
Schubert, H., Wiss. Z. Univ. Halle, vol. XIX, '70 M, H 5, pp. 1–18.
Nash, J. A., et al., Mol. Cryst. Liq. Cryst., vol. 25, pp. 299–321 (1974).
Bloom, A., et al., Mol. Cryst. Liq. Cryst., vol. 40, pp. 213–221 (1977).
Grakauskas, V. A., et al., JACS, vol. 80, pp. 3155–3159 (1958).

Schubert, H., et al.; J. Prakt. Chemie, vol. 312, pp. 494–506 (1970).

Primary Examiner—Teddy S. Gron
Attorney, Agent, or Firm—Jordan and Hamburg

[57] ABSTRACT

A nematic liquid crystal mixture for modulation of the transmitted or incident light and for rendition of colored numerals, symbols and images in electro-optical devices, the said mixture comprising (a) a nematic liquid crystal adapted for reorientation in an electrical field due to its dielectric anisotropy and (b) a dichroic dyestuff adapted for simultaneous orientation changes together with the said nematic liquid crystal between a light absorption and a light transmission position based on the guest-host effect, the said dyestuff being an s-tetrazine derivative having an elongate molecular structure and having the formula

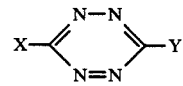

wherein X is

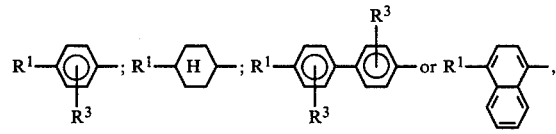

$R^1$ and Y is $R^2$— or

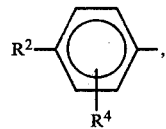

$R^1$ being H—, F—, Cl—, Br—, J—, $O_2N$—, NC—, HO—, $H_2N$—, $C_nH_{2n+1}NH$—, $C_nH_{2n+1}(CH_3)N$—, $C_nH_{2n+1}''$—, $C_nH_{2n+1}O$—, $C_nH_{2n+1}S$—, $C_nH_{2n+1}COS$—, $C_nH_{2n+1}COO$—, $C_nH_{2n+1}OOC$—, $C_nH_{2n+1}CO$— or $C_nH_{2n+1}OCOO$—, and $R^2$ being H—, F—, Cl—, Br—, J—, $O_2N$—, NC—, HO—, $H_2N$—, $C_nH_{2n+1}NH$—, $C_nH_{2n+1}(CH_3)N$—, $C_nH_{2n+1}$—, $C_nH_{2n+1}O$—, $C_nH_{2n+1}S$—, $C_nH_{2n+1}COS$—, $C_nH_{2n+1}COO$—, $C_nH_{2n+1}OOC$—, $C_nH_{2n+1}CO$— or $C_nH_{2n+1}OCOO$—, and $R^3$ being H—, F—, Cl—, Br—, J—, $CH_3$— or $CF_3$—, and $R^4$ being H—, F—, Cl—, Br—, J—, $CH_3$—, or $CF_3$—,
n is a positive integer.

10 Claims, No Drawings

NEMATIC LIQUID CRYSTAL MIXTURES

CROSS-REFERENCE TO RELATED APPLICATION

The present application is a continuation-in-part application of our copending patent application Ser No. 046,842 filed June 8, 1979, now abandoned.

BACKGROUND OF THE INVENTION

The invention relates to nematic liquid crystal mixtures for use in electro-optical devices on the basis of the guest-host effect in order to modulate the transmitted or incident light particularly for the colored reproduction of numerals, symbols and images.

Nematic liquid crystals are known which can be reoriented in electrical fields due to their dielectric anisotropy. If the nematic liquid crystals are placed in suitable electrical cells it is possible to provide devices for modulation of the transmittent or incident light and, as above stated, for the colored rendition of numerals, symbols and images.

The technical effect of these electro-optical structural elements, however, may be based on different technical mechanisms. If nematic crystals are used with a twisted structure, two polarization filters are necessary, and only the black and white rendition of symbols is possible (M. Schadt, W. Helfrich: Applied Physics Letters 18, 127 (1971)).

If, however, cells are used which operate on the basis of the guest-host effect, only one polarizer is necessary, and a colored reproduction is possible (G. H. Heilmeier, L. A. Zanoni: Applied Physics Letters 13, 91 (1968). However, with crystals adapted for the guest-host effect it is necessary to add to the liquid crystal a dichroic dyestuff which is oriented simultaneously with the liquid crystal and can be switched due to the action of the electrical field between an absorption position and a light transmitting position.

The dyestuffs heretofore known for this purpose were usually chemical compositions with azo groups which either were slightly soluble in the liquid crystals or over an extended period of time underwent changes under the action of visible and ultraviolet light or also exhibited a dichroism which was too weak. Thus, these electro-optical structural elements were not useful for operation over long periods of time because the dyestuffs crystallized out or because decomposition at longer times of operation resulted in a decrease of the possible color contrast.

It is therefore an object of the invention to provide for electro-optical structural elements on the basis of the guest-host effect for the modulation of light and colored rendition of images, etc. which also have a strong color contrast for extended periods of operation and are devoid of the shortcomings of the prior art products.

The purpose of the invention is therefore the provision of a mixture of a dyestuff, or provision of a specific dyestuff which can be mixed, with a nematic liquid crystal and which has a high chemical and thermal stability and a pronounced dichroism in the visible spectrum range and is therefore suited for electro-optical elements intended for long periods of operation.

SUMMARY OF THE INVENTION

These objects are obtained by a mixture of the known nematic liquid crystals which operate on the basis of the guest-host effect in which the dyestuff added to the nematic matrix compound is constituted by a derivative of s-tetrazine having a rod-like molecular structure and corresponding to the formula

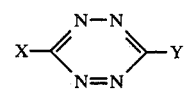

wherein X is

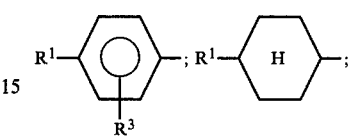

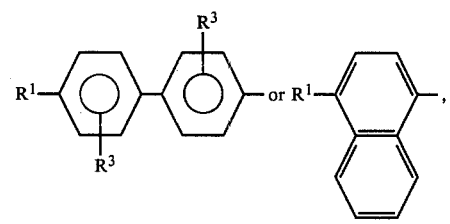

$R^1$ and Y is $R^2$— or

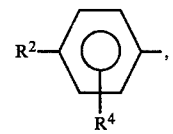

$R^1$ being H—, F—, Cl—, Br—, J—, $O_2N$—, NC—, HO—, $H_2N$—, $C_nH_{2n+1}NH$—, $C_nH_{2n+1}(CH_3)N$—, $C_nH_{2n+1}$—, $C_nH_{2n+1}O$—, $C_nH_{2n+1}S$—, $C_nH_{2n+1}COS$—, $C_nH_{2n+1}COO$—, $C_nH_{2n+1}OOC$—, $C_nH_{2n+1}CO$— or $C_nH_{2n+1}OCOO$—, and $R^2$ being H—, F—, Cl—, Br—, J—, $O_2N$—, NC—, HO—, $H_2N$—, $C_nH_{2n+1}NH$—, $C_nH_{2n+1}(CH_3)N$—, $C_nH_{2n+1}$—, $C_nH_{2n+1}O$—, $C_nH_{2n+1}S$—, $C_nH_{2n+1}COS$—, $C_nH_{2n+1}COO$—, $C_nH_{2n+1}OOC$—, $C_nH_{2n+1}CO$— or $C_nH_{2n+1}OCOO$—, and $R^3$ being H—, F—, Cl—, Br—, J—, $CH_3$— or $CF_3$—, and $R^4$ being H—, F—, Cl—, Br—, J—, $CH_3$—, or $CF_3$—, n is a positive integer.

The dyestuffs of the invention have a high chemical and thermic stability, stability for exposure for long periods of time to visible or ultraviolet light, have a strong color of their own and a pronounced negative dichroism in the visible spectrum range. They furthermore have generally a high solubility in liquid crystals.

It should be understood that part of the s-tetrazine derivatives of the invention is already a liquid crystal per se, that is in pure condition before addition to the nematic liquid crystal. This of course is particularly useful in connection with the guest-host effect.

Examples of the dyestuffs of the invention which can be used in the mixtures with the nematic crystals are the following:

3-n-alkyl-6-(4-chloro-phenyl)-s-tetrazines
3-hydroxy-6-(4-alkyloxy-phenyl)-s-tetrazines 3-phenyl-6-ethoxy-s-tetrazines
3-phenyl-6-methyl-s-tetrazines
3-methyl-6-(4-chloro-phenyl)-s-tetrazines
3-(3-methyl-phenyl)-s-tetrazines
3-(2-naphthyl)-s-tetrazines
3-6-bis(4-n-alkylphenyl)-s-tetrazines
3-(4-n-alkyloxy-phenyl)-6-alkyl-s-tetrazines
3-(4-cyano-phenyl)-6-n-alkyl-s-tetrazines
3-(4-n-alkylphenyl)-6-(4-n-alkyloxyphenyl)-s-tetrazines.

The tetrazines which per se are not liquid crystals are preferably added in amounts of 0.5–5% by weight; the liquid crystal tetrazines in amounts of 5–90% by weight.

PREFERRED EMBODIMENTS OF THE INVENTION

Example 1

A mixture was used in this case as the nematic liquid crystal which had the following composition.

| | |
|---|---|
| 5-n-hexyl-2-(4-n-hexyloxy-phenyl)-pyrimidine | 68.5 mol % |
| 5-n-hexyl-2-(4-n-nonyloxy-phenyl)-pyrimidine | 31.5 mole % |

This composition was a nematic liquid crystal in the range between 4° and 60° C. and had a positive dielectric anisotropy.

Added to this mixture were then 2% by weight relative to the nematic liquid crystal of 3-(4-methyl-phenyl)-s-tetrazine which was a red substance having the melting point of 72° C. The thus formed mixture remained nematic in the temperature range between 3° and 58° C. while it assumed a distinctly red coloration.

If this red mixture was placed into an electro-optical cell between electrodes which were subjected to frictional action (rubbing) in a definite direction, the liquid crystal received a prevailing orientation in the direction parallel to the direction of the friction action. Accordingly, when viewed through a polarizer of which the polarization plane was oriented parallel to the direction of friction, it appeared colorless. When an electrical field was applied to this device of 9 V/50 Hz an intensely red colored condition was obtained. If the transparent electrodes had a definite shape the rendition of numerals, symbols and images was possible.

Example 2

A nematic crystal composition was used in this case which was as follows:

| | |
|---|---|
| 4-n-propyl-cyclohexanecarboxylic acid-(4-cyano-phenylester) | 34.5 mol % |
| 4-n-butyl-cyclohexanecarboxylic acid-(4-cyano-phenylester) | 31 mol % |
| 4-n-pentyl-cyclohexanecarboxylic acid-(4-cyano-phenylester) | 34.5 mol % |

To this composition there were added 20% by weight relative to the nematic crystal of 3-[4-n-pentyloxy-phenyl]-6-n-pentyl-s-tetrazine. There resulted a red colored compound which had nematic liquid crystal properties. Its melting point was 60° C. and its clear point 59.5° C. The resulting mixture was a nematic liquid crystal mixture at room temperature and had a vigorous red coloration.

In an electro-optical device as used in Example 1 the nematic liquid crystal could be switched by use of an electrical field of 3 V/50 Hz between a colorless and a red condition. This switching could be effected as often as desired. Even after an operation time of 500 hours under the action of daylight, no ageing phenomena were observed.

Example 3

To the liquid crystal composition with 20% of the 3-[4-n-pentyloxyphenyl]-6-n-pentyl-s-tetrazine of example 2, 1% by weight of Indophenolblue is added. This mixture, used as an homogeneous layer in the device of example 1, will appear blue without electric field, and red by use of an electrical field of 3 V/50 Hz. This switching between two colors enhances the optical contrast for the human eyes.

Instead of Indophenolblue, other dyestuffs may also be used, e.g.
Sudanblack B
Isolar Green M
N-N'-Dimethylindigo
4-Nitrobenzylidene phenylhydrazone.

The nematic liquid crystals which operate on the basis of the guest-host-effect (G. H. Heilmeier, L. A. Zanoni Appl. Phys. Lett. 13, 91 (1968)) are known per se and are for instance described in A S No. 2 257 588 and O S No. 2 429 093.

Examples of such liquid crystal compositions in addition to the compositions given in above examples 1, 2 and 3 would be for instance the following:
4-n-Alkylbenzylidene-4'-cyano anilines (U.S. Pat. Nos. 3,795,436 and 3,927,064)
4-n-Alkyloxybenzylidene-4'-cyano anilines (U.S. Pat. Nos. 3,499,702; 3,597,044 and 3,792,915)
4-Cyanophenyl 4'-alkylbenzoates (U.S. Pat. No. 3,795,436)
4-Alkyl-4'-cyano biphenyls (G. W. Gray et al., Liquid Crystals and Ordered Fluids, Plenum Press New York 1974, p. 617
4-Alkyl-4'-cyclohexyl cyclohexanes (R. Eidenschink, D. Erdmann, J. Krause, L. Pohl, Angew. Chem. 90, 133 (1978)).

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A nematic liquid crystal composition for modulation of transmitted or incident light, and for rendition of numerals, symbols, and images in color in electro-optical devices, comprising
   (A) a nematic liquid crystal adapted for reorientation in an electric field due to its dielectric anisotropy, and
   (B) a dichroic dyestuff adapted for simultaneous orientation with said nematic liquid crystal (A) between a light absorption and a light transmission position based on the guest-host effect, said dichroic dyestuff (B) an s-tetrazine derivative with rod-like molecular structure of the formula

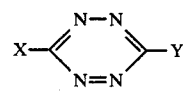

wherein X is

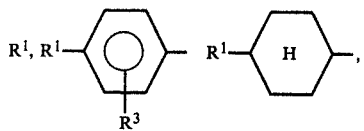

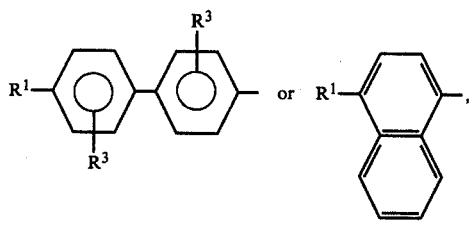

Y is R²— or

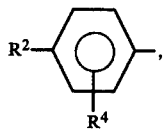

R¹ is H—, F—, Cl—, Br—, I—, O₂N—, NC—, HO—, H₂N, $C_nH_{2n+1}NH-$, $C_nH_{2n+1}(CH_3)N-$, $C_nH_{2n+1}-$, $C_nH_{2n+1}O-$, $C_nH_{2n+1}S-$, $C_nH_{2n+1}COS-$, $C_nH_{2n+1}COO-$, $C_nH_{2n+1}OOC-$, $C_nH_{2n+1}CO-$ or $C_nH_{2n+1}OCOO-$,

R² is H—, F—, Cl—, Br—, I—, O₂N—, NC—, HO—, H₂N—, $C_nH_{2n+1}NH-$, $C_nH_{2n+1}(CH_3)N-$, $C_nH_{2n+1}-$, $C_nH_{2n+1}O-$, $C_nH_{2n+1}S-$, $C_nH_{2n+1}COS-$, $C_nH_{2n+1}COO-$, $C_nH_{2n+1}OOC-$ $C_nH_{2n+1}CO-$ or $C_nH_{2n+1}OCOO-$,

R³ is H—, F—, Cl—, Br—, I—, CH₃— or CF₃—, and R⁴ is H—, F—, Cl—, Br—, I—, CH₃—, or CF₃—, n is a positive integer.

2. The composition of claim 1 wherein said dyestuff (B) is selected from the group consisting of 3-n-alkyl-6-(4-chlorophenyl)-s-tetrazine, 3-hydroxy-6-(4-alkoxyphenyl)-s-tetrazine, 3-phenyl-6-ethoxy-s-tetrazine, 3-phenyl-6-methyl-s-tetrazine, 3-methyl-6-(4-chlorophenyl)-s-tetrazine, 3-(3-methylphenyl)-s-tetrazine, 3-(2-naphthyl)-s-tetrazine, 3,6-bis(4-n-alkylphenyl)-s-tetrazine, 3-(4-n-alkoxyphenyl)-6-alkyl-s-tetrazine, 3-(4-cyano phenyl)-6-n-alkyl-s-tetrazine, 3-(4-n-alkyl-phenyl)-6-(4-n-alkoxyphenyl)-s-tetrazine, and mixtures thereof.

3. The composition of claim 2 wherein said dyestuff (B) not in the form of a liquid crystal is present in an amount from 0.5 to 5% by weight.

4. The composition of claim 2 wherein said dyestuff (B) in the form of a liquid crystal is present in an amount of from 5 to 90% by weight.

5. The composition of claim 2 wherein said nematic liquid crystal (A) is selected from the group consisting of 5-n-hexyl-2-(4-n-hexoxyphenyl)-pyrimidine, 5-n-hexyl-2-(4-n-nonylphenyl)pyrimidine, 4-n-propylcyclohexanecarboxylic acid 4-cyanophenylester, 4-n-butylcyclohexane carboxylic acid 4-cyanophenylester, 4-n-pentylcyclohexanecarboxylic acid 4-cyanophenylester, 4-n-alkylbenzylidene-4'-cyano anilines, 4-n-alkyloxybenzylidene-4'-cyano anilines, 4-cyanophenyl-4'-alkylbenzoates, 4-alkyl-4'-cyanobiphenyls, 4-alkyl-4'-cyclohexylcyclohexanes, and mixtures thereof.

6. The composition of claim 5 comprising an additional dyestuff (C).

7. The composition of claim 6 wherein said additional dyestuff (C) is selected from the group consisting of Indophenol blue, Sudanblack B, Isolar Green M, N,N'-dimethylindigo, 4-nitrobenzylidene phenylhydrazine, and mixtures thereof.

8. The composition of claim 5 wherein
(A) said nematic liquid crystal comprises a mixture of 5-n-hexyl-2-(4-n-hexoxyphenyl) pyrimidine and 5-n-hexyl-2-(4-n-nonylphenyl) pyrimidine, in the nematic liquid crystal phase between 4° and 60° C. and exhibiting positive dielectric anistropy, and
(B) said dyestuff is 3-(4-methylphenyl)-s-tetrazine, said composition in the nematic liquid crystal phase between 3° and 58° C., assuming a red coloration.

9. The composition of claim 5 wherein
(A) said nematic liquid crystal comprises a mixture of 4-n-propyl-cyclohexane carboxylic acid (4-cyano phenylester), 4-n-butyl-cyclohexanecarboxylic acid (4-cyanophenylester) and 4-n-pentyl-cyclohexanecarboxylic acid (4-cyano phenylester), and
(B) said dyestuff is 3-(4-n-pentoxyphenyl)-6-n-pentyl-s-tetrazine,
said composition exhibiting red coloration.

10. The composition of claim 7 wherein
(B) said dyestuff is 3-(4-n-pentoxyphenyl)-6-n-pentyl-s-tetrazine, and
(C) said additional dyestuff is Indophenol blue.

* * * * *